UNITED STATES PATENT OFFICE.

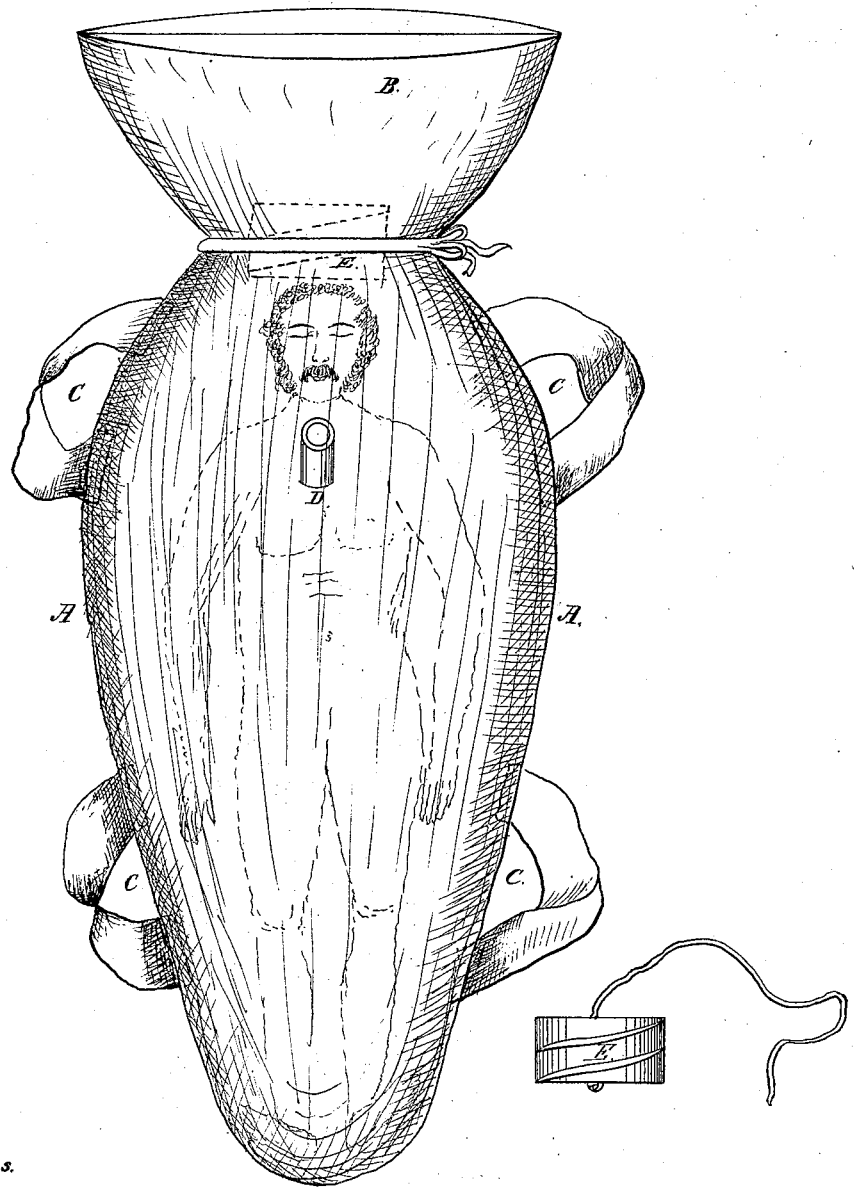

DR. THOMAS HOLMES, OF WASHINGTON, DISTRICT OF COLUMBIA.

IMPROVEMENT IN RECEPTACLES FOR DEAD BODIES.

Specification forming part of Letters Patent No. 39,291, dated July 21, 1863; antedated July 4, 1863.

*To all whom it may concern:*

Be it known that I, THOMAS HOLMES, M. D., of Washington city, District of Columbia, have invented a new and useful Elastic and Deodorizing Receptacle; and I do hereby declare that the following is a full and exact description thereof, reference being had to the accompanying drawings, and to the letters of reference marked thereon, making a part of this specification.

The nature of my invention consists in an oval-shaped elastic receptacle, which is portable, having a funnel-shaped top, handles at the sides, a grooved block, and a tube for deodorizing purposes.

The object of my invention is to facilitate the carrying of badly-wounded dead bodies hurriedly away that could not otherwise be quickly removed for the want of proper conveyances, or difficulty to procure boxes or coffins for removing the dead, as the boxes or coffins cannot be so easily transported or handled on the field of battle.

A represents the elastic and deodorizing receptacle, made of india-rubber or other air-tight elastic cloth, oval-shaped, about six feet in length and about two and a half feet in width at the widest part. The top B is funnel-shaped, so that a dead body may easily be thrust in at the top, and when placed in the inside the receptacle fits to the shape of the body. It has two handles, C, on each side, so that the body can be immediately lifted up and carried off by one or two persons to be transported safely to any desired place to be inclosed in a box or coffin. There is an aperture and tube, D, attached near to the center of the receptacle, through which deodorizing substances are inserted for the purpose of preserving the body a short time, until received by its friends to be embalmed or prepared for interment. In the neck of the receptacle I have a grooved round block, E, which, when the body is to be deposited in the receptacle, I remove, and then insert it to expand the receptacle and prevent it from touching the face of the body, and a cord is wound tightly around the outside to keep the receptacle air-tight.

What I claim as my invention, and desire to secure by Letters Patent, is—

The elastic receptacle, with funnel-shaped top, handles at the sides, deodorizing-tube, and grooved block, as herein described, for the purpose of preserving and more easily transporting dead bodies.

THOS. HOLMES.

Witnesses:
J. FRANKLIN REIGART,
DANL. ROWLAND.